(12) United States Patent
Bao et al.

(10) Patent No.: US 11,574,408 B2
(45) Date of Patent: Feb. 7, 2023

(54) MOTION ESTIMATION METHOD, CHIP, ELECTRONIC DEVICE, AND STORAGE MEDIUM

(71) Applicant: AMLOGIC (SHANGHAI) CO., LTD, Shanghai (CN)

(72) Inventors: Zheng Bao, Shanghai (CN); Tao Ji, Shanghai (CN); Chun Wang, Shanghai (CN); Dongjian Wang, Shanghai (CN); Xuyun Chen, Shanghai (CN)

(73) Assignee: Amlogic (Shanghai) Co., Ltd., Shanghai (CN)

(*) Notice: Subject to any disclaimer, the term of this patent is extended or adjusted under 35 U.S.C. 154(b) by 58 days.

(21) Appl. No.: 17/304,961

(22) Filed: Jun. 29, 2021

(65) Prior Publication Data
US 2021/0407105 A1 Dec. 30, 2021

(30) Foreign Application Priority Data

Jun. 30, 2020 (CN) .......................... 202010615725.7

(51) Int. Cl.
G06T 7/231 (2017.01)
G06T 7/215 (2017.01)
H04N 7/01 (2006.01)

(52) U.S. Cl.
CPC .............. *G06T 7/231* (2017.01); *G06T 7/215* (2017.01); *H04N 7/014* (2013.01); *H04N 7/0127* (2013.01); *G06T 2207/10016* (2013.01)

(58) Field of Classification Search
CPC ..................... G06T 7/231; G06T 7/215; G06T 2207/10016; H04N 7/0127; H04N 7/014
USPC .......................................... 382/107
See application file for complete search history.

(56) References Cited

U.S. PATENT DOCUMENTS

2019/0141334 A1* 5/2019 Lim ..................... H04N 19/117
2020/0154135 A1* 5/2020 Lee ...................... H04N 19/577

OTHER PUBLICATIONS

Suk-Ju Kang et al, "Dual motion Estimation for Frame Rate Up-Conversion", IEEE Transactions on Circuits and Systems for Video Technology, IEEE, USA, vol. 20, No. 12, Dec. 1, 2010 (Dec. 1, 2010), pp. 1909-1914, XP011329400, ISSN: 1051-8215, DOI: 10.119/TCSVT.2010.2087832.

* cited by examiner

*Primary Examiner* — Allen C Wong

(74) *Attorney, Agent, or Firm* — Lorenz & Kopf, LLP

(57) ABSTRACT

The present disclosure relates to a motion estimation method, a chip, an electronic device, and a storage medium. The present disclosure is beneficial to improving the accuracy of motion estimation.

17 Claims, 6 Drawing Sheets

```
┌─────────────────────────────────────────────────────────┐
│ providing an original frame, the original frame         │─S1
│ comprising an adjacent previous frame and a current frame│
└─────────────────────────────────────────────────────────┘
                              │
┌─────────────────────────────────────────────────────────┐
│ obtaining a matching block in the previous frame        │
│ corresponding to a current block of the current frame   │
│ using a full search method; obtaining a matching block  │─S2
│ in the current frame corresponding to the current block │
│ of the previous frame utilizing a full search method    │
└─────────────────────────────────────────────────────────┘
                              │
┌─────────────────────────────────────────────────────────┐
│ obtaining a first candidate vector set corresponding to │
│ A corresponding block of the current frame based on the │
│ current block of the current frame and the corresponding│─S3
│ matching block; obtaining a second candidate vector set │
│ corresponding to a corresponding block of the previous  │
│ frame based on the current block of the previous frame  │
│ and the corresponding matching block                    │
└─────────────────────────────────────────────────────────┘
                              │
┌─────────────────────────────────────────────────────────┐
│ setting a frame to be interpolated between the previous │─S4
│ frame and the current frame                             │
└─────────────────────────────────────────────────────────┘
                              │
┌─────────────────────────────────────────────────────────┐
│ obtaining a bidirectional motion vector corresponding to│
│ the current block of the frame to be interpolated based │
│ on the first candidate vector set and the second        │─S5
│ candidate vector set, as a candidate motion vector of   │
│ the corresponding block of the frame to be interpolated │
└─────────────────────────────────────────────────────────┘
```

FIG. 2

MOTION ESTIMATION METHOD, CHIP, ELECTRONIC DEVICE, AND STORAGE MEDIUM

CROSS-REFERENCE TO RELATED APPLICATION

This application claims priority to Chinese Patent Application No. 202010615725.7, filed Jun. 30, 2020, which is incorporated in its entirety by reference.

TECHNICAL FIELD

The present disclosure relates to the field of image processing technologies, and in particular, to a motion estimation method, a chip, an electronic device, and a storage medium.

BACKGROUND

A video frame rate is a measure of the number of frames played by a display device in one second, and in general, human eyes feel more realistic and smooth in a video at a frame rate of 60 frames per second. In practical application, when video resources of a low frame rate are played on a display device, human eyes can feel jitter and blur. To solve the video jitter and blur effect caused by the low frame rate, the subjective visual effect of the video image can be improved by the video frame rate increasing technique. If we simply use a simple frame repetition or a method of averaging adjacent frames to increase the frame rate, the problem of video jitter and blur cannot be solved.

The main techniques for video frame rate conversion are motion estimation (ME) and motion compensation (MC). Among them, the basic idea of motion estimation is that each frame of the image sequence is divided into a plurality of macroblocks that do not overlap each other, and the amount of displacement of all pixels in the macroblock is considered to be the same, and then for the most similar block in the reference frame with the current block is found for each macroblock, i.e., the matching block, according to a certain matching criterion in a given specific search range, the relative displacement of the matching block and the current block is the motion vector, and the process of obtaining the motion vector is called motion estimation. Motion compensation refers to predicting and compensating for a local image of the current interpolated frame using a motion vector calculated by the motion estimation method.

One currently widely used motion estimation algorithm is a three-dimensional (3D) recursive search algorithm, namely a block matching method that employs a three-dimensional recursive search to estimate the motion of an image. In the block matching approach of three-dimensional recursive search, the motion vector for the current block is a correction of the small range of temporal, spatial-predicted motion vectors. The motion vector of the current block is also the candidate vector of space domain and time domain of the next block and the neighboring block in the next row.

SUMMARY

The present disclosure provides a motion estimation method, a chip, an electronic device, and a storage medium, to improve the accuracy of motion estimation.

In some embodiments, a motion estimation method includes: providing an original frame, the original frame comprising an adjacent previous frame and a current frame; obtaining a matching block in the previous frame corresponding to a current block of the current frame using a full search method; obtaining a matching block in the current frame corresponding to the current block of the previous frame utilizing a full search method; obtaining a first candidate vector set corresponding to a corresponding block of the current frame based on the current block of the current frame and the corresponding matching block; obtaining a second candidate vector set corresponding to a corresponding block of the previous frame based on the current block of the previous frame and the corresponding matching block; setting a frame to be interpolated between the previous frame and the current frame, and obtaining a bidirectional motion vector corresponding to the current block of the frame to be interpolated based on the first candidate vector set and the second candidate vector set, as a candidate motion vector of the corresponding block of the frame to be interpolated.

The technical solutions of embodiments of the present disclosure have the following advantages. In the motion estimation method provided by the embodiment of the present disclosure, by utilizing a full search method, the current block of the current frame is matched with all blocks within the search range of the corresponding position of the previous frame, and the current block of the previous frame is matched with all blocks within the search range of the corresponding position of the current frame, and the search step size of the full search method is small, thereby a more accurate motion direction of the original frame is provided for estimating the motion direction of the frame to be interpolated, which facilitates increasing the accuracy of motion estimation, and in particular, the accuracy of the motion estimation of the small object is improved. Furthermore, the bidirectional motion vector corresponding to the current block of the frame to be interpolated is obtained based on the first candidate vector set and the second candidate vector set obtained by using the full search method, thus, it is beneficial to ensure the motion continuity between the corresponding block of the frame to be interpolated and the previous frame and the current frame, especially to ensure the continuity of the motion of the small object, further improving the accuracy of motion estimation and reducing the probability of occurrence of problems such as "overlap" and "hole".

BRIEF DESCRIPTION OF THE DRAWINGS

The accompanying drawings, which comprise a part of this specification, illustrate several embodiments and, together with the description, serve to explain the principles and features of the disclosed embodiments. In the drawings:

FIG. 2 is a flowchart of an embodiment of the motion estimation method provided by the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses, systems and methods consistent with aspects related to the disclosure as recited in the appended claims.

According to the background technology, the 3D recursive search algorithm has been widely used in the frame rate conversion technology. However, this kind of motion estimation method has the problem of poor accuracy of motion vector estimation, especially for small objects in foreground motion.

Specifically, the three-dimensional recursive search algorithm uses the continuity of object motion in the video to perform motion estimation by means of time and spatial recursion. Time recursion is to transfer the motion vector of the adjacent block of the previous frame to the block of the current frame by taking advantage of the correlation between the block of the current frame and the adjacent block of the corresponding position of the previous frame in motion.

Likewise, the spatial recursion is to transfer the adjacent block motion vectors of the current frame to the current block by taking advantage of the correlation between the block of the current frame and the adjacent block of the current frame in motion.

However, in some special scenarios, the motion vector of the current block is not exactly the temporal, spatial adjacent block's motion vector. For example, there is a scene in which there is a small object motion in the image, if only the motion vector of the spatio-temporal recursion is used as the candidate motion vector, the small object is likely to be submerged in the background, and the correct motion vector pointing to the small object cannot be found.

Figure 1:
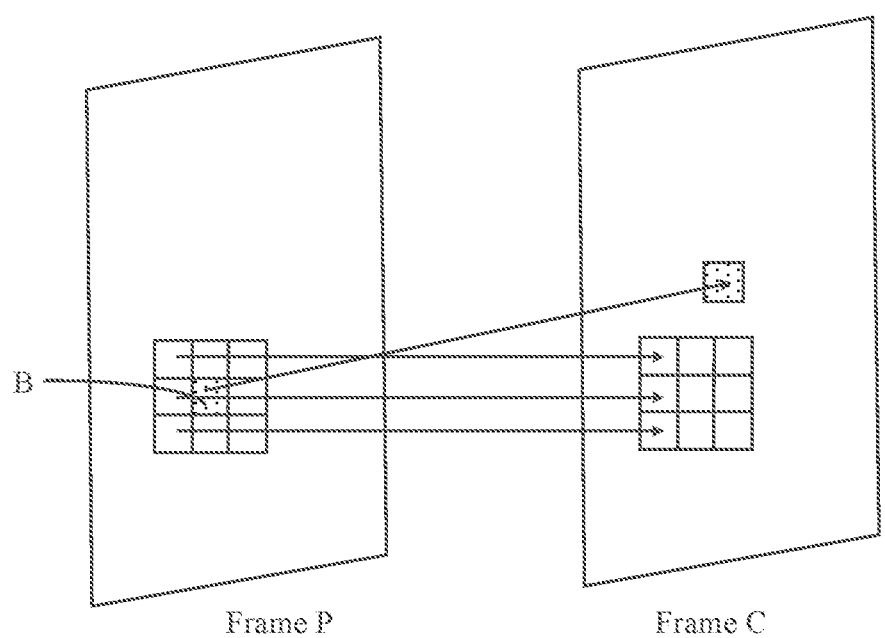
FIG. 1 is a schematic diagram of a motion estimation method.

As shown in FIG. 1, there is shown a schematic diagram of a motion estimation method in which a gray region represents a background in an image, a block B is a small object of foreground motion, a small object refers to a block having an area size of approximately equal to an area size of one block, the frame P represents a previous frame, and the frame C represents a current frame; in FIG. 1, the motion vector of each background block is relatively small, most of which are stationary, and the motion vector is approximately zero. When the motion vector of the block B is calculated, the motion vector of the small object cannot be correctly expressed due to the fact that most of the blocks around the moving foreground small object are stationary, and the motion vector is about zero.

In other words, in the three-dimensional recursive search algorithm, the image is divided into a plurality of blocks with the same size, the candidate motion vectors of the current block time recursion and space recursion are obtained by three-dimensional recursive search algorithm, while the candidate motion vectors obtained by the three-dimensional recursive search algorithm are only from the adjacent motion vectors of the current frame and the previous frame, so that the correct motion vector cannot be found for the moving small object in the image, and then it is easily to lose the image of the moving small objects.

To solve the technical problem above, the embodiment of the disclosure provides a motion estimation method, comprising: providing an original frame, the original frame comprising an adjacent previous frame and a current frame; obtaining a matching block in the previous frame corresponding to a current block of the current frame using a full search method; obtaining a matching block in the current frame corresponding to the current block of the previous frame utilizing a full search method; obtaining a first candidate vector set corresponding to a corresponding block of the current frame based on the current block of the current frame and the corresponding matching block; obtaining a second candidate vector set corresponding to a corresponding block of the previous frame based on the current block of the previous frame and the corresponding matching block; setting a frame to be interpolated between the previous frame and the current frame; and obtaining a bidirectional motion vector corresponding to the current block of the frame to be interpolated based on the first candidate vector set and the second candidate vector set, as a candidate motion vector of the corresponding block of the frame to be interpolated.

In the motion estimation method provided by the embodiment of the present disclosure, by utilizing a full search method, the current block of the current frame is matched with all blocks within the search range of the corresponding position of the previous frame, and the current block of the previous frame is matched with all blocks within the search range of the corresponding position of the current frame, and the search step size of the full search method is small, thereby a more accurate motion direction of the original frame is provided for estimating the motion direction of the frame to be interpolated, which facilitates increasing the accuracy of motion estimation, and in particular, the accuracy of the motion estimation of the small object is improved. Furthermore, the bidirectional motion vector corresponding to the current block of the frame to be interpolated is obtained based on the first candidate vector set and the second candidate vector set obtained by using the full search method, thus, it is beneficial to ensure the motion continuity between the corresponding block of the frame to be interpolated and the previous frame and the current frame, especially to ensure the continuity of the motion of the small object, further improving the accuracy of motion estimation and reducing the probability of occurrence of problems such as "overlap" and "hole".

FIG. 2 is a flowchart of an embodiment of a motion estimation method provided by the present disclosure. As an example, the motion estimation method of the present embodiment comprises the following basic steps:

Step S1: providing an original frame, the original frame comprising an adjacent previous frame and a current frame;

Step S2: obtaining a matching block in the previous frame corresponding to a current block of the current frame using a full search method; obtaining a matching block in the current frame corresponding to the current block of the previous frame utilizing a full search method;

Step S3: obtaining a first candidate vector set corresponding to a corresponding block of the current frame based on the current block of the current frame and the corresponding matching block; obtaining a second candidate vector set corresponding to a corresponding block of the previous frame based on the current block of the previous frame and the corresponding matching block;

Step S4: setting a frame to be interpolated between the previous frame and the current frame; and Step S5: obtaining a bidirectional motion vector corresponding to the current block of the frame to be interpolated based on the first candidate vector set and the second candidate vector set, and used as a candidate motion vector of the corresponding block of the frame to be interpolated.

In order to make the above objects, features and advantages of the embodiments of the present disclosure more comprehensible, detailed description of specific embodiments of the present disclosure is provided below in connection with the accompanying drawings.

Referring to FIG. 2, executing step S1: providing an original frame, the original frame comprising an adjacent previous frame and a current frame.

The original frame is the video frame sequence corresponding to the video image without processed by a video frame rate conversion technique.

Subsequent motion estimation is performed on the previous frame and the current frame to obtain a unidirectional motion vector, which points from the previous frame to the current frame or from the current frame to the previous frame, the unidirectional motion vector is used as the candidate motion vector of the original frame.

The previous frame and the current frame may be any two adjacent frames in the original frame.

Continuing to refer to FIG. 2, in this embodiment, the motion estimation method further comprises: before a full search method is utilized to obtain a matching block in the previous frame corresponding to the current block of the current frame, and before obtaining a matching block in the current frame corresponding to the current block of the previous frame using a full search method, identifying a block corresponding to a foreground moving small object in the previous frame and the current frame. In practice, utilizing image segmentation method to identify the block corresponding to the foreground moving small object in the previous frame and the current frame.

In this embodiment, the small object refers to a block having an area size of approximately equal to one block.

In a video image, the surrounding blocks of the foreground moving small object are background areas, the block of the background area is typically a stationary block, in other words, the motion vector of the block in the background region is about zero, and the area of the foreground moving small object is small and there is large moving difference between the foreground moving small object and the background area, if the adjacent blocks around the small object are directly used to perform motion estimation on the small object, the problem of inaccurate estimation is easy to exist, therefore, by identifying a block corresponding to the moving small object in the current frame and the previous frame, the corresponding matching block is obtained only for the moving small object by using a full search method, which is beneficial to improve the accuracy of the motion estimation, and reduce the operation complexity and the amount of operation, thus the response speed is improved and the cost is saved.

Continuing to refer to FIG. 2, the step S2 is executed; obtaining a matching block in the previous frame corresponding to a current block of the current frame using a full search method; and obtaining a matching block in the current frame corresponding to the current block of the previous frame utilizing a full search method.

The current block is a block in which motion estimation needs to be performed in a current frame or a previous frame.

obtaining a matching block in the previous frame corresponding to a current block of the current frame, so that the unidirectional motion vector which points from the block of the current frame to the corresponding matching block in the previous frame can be obtained subsequently according to the current block of the current frame and the corresponding matching block as a backward motion vector of the corresponding block of the current frame.

obtaining a matching block in the current frame corresponding to the current block of the previous frame, so that a unidirectional motion vector pointing from the block of the previous to the matching block of the current frame can be obtained subsequently according to the current block of the previous frame and the corresponding matching block as a forward motion vector of the corresponding block of the previous frame.

Full search algorithm is the simplest and most reliable search matching method, by using the full search method, the current block of the current frame is matched with all blocks in the search range of the corresponding position of the previous frame, and the current block of the previous frame is matched with all blocks in the search range of the corresponding position of the current frame, that is, the full search algorithm calculates the match errors of the two blocks in all possible positions in the search window, the obtained motion vector corresponding to the minimum matching error is the global optimal motion vector, furthermore, the search step size of the full search method is small, thereby a more accurate motion direction of the original frame is provided for estimating the motion direction of the frame to be interpolated, which facilitates increasing the accuracy of motion estimation, and in particular, the accuracy of the motion estimation of the small object is improved.

In this embodiment, before a full search method is utilized to obtain a matching block in the previous frame corresponding to the current block of the current frame, and before obtaining a matching block in the current frame corresponding to the current block of the previous frame using a full search method, identifying a block corresponding to a foreground moving small object in the previous frame and the current frame, therefore, the matching block corresponding to the corresponding block of the moving small object is obtained through the full search method, the block matched with the corresponding block of the current frame small object is searched in the previous frame, and the block matched with the corresponding block of the previous frame small object is searched in the current frame, so that a more accurate original frame motion direction is provided for the moving small object, thereby facilitating finding a more accurate motion vector for the moving small object, and operation amount is reduced and the operation efficiency is improved.

Specifically, in this embodiment, the full search method searches all pixel points in the search range, as an example, the search step size of the full search method is one pixel, the process of searching and matching is to conduct a blanket search in the step size of one pixel, the similarity is compared point by point, which is of great significance for searching and matching of small objects in the video, and the accuracy of obtaining the corresponding matching block of the motion small object is facilitated.

Accordingly, when a backward motion vector is subsequently obtained according to the current block and the corresponding matching block, the accuracy of the estimation of the motion direction for the moving small object is improved advantageously.

It should be noted that in other embodiments, in order to reduce the calculation amount and increase the response speed, and according to the actual operation accuracy requirements, the search step size of the full search method can also be greater than one pixel, for example, the search step size of the full search method is an integer multiple of one pixel and smaller than the side length of the block. In other words, the search step size of the full search method is greater than or equal to one pixel, and the search step size of the full search method is smaller than the side length of the block, that is, the search step size of the full search method is smaller than the side length of the moving small object, compared with the method that utilizes the adjacent block around the block of the small object to perform motion estimation on the small object, the search step size of the full search method provided by the embodiment of the disclosure is smaller, and the search process is finer, thus a more accurate motion direction is estimated for the motion small object.

In this embodiment, obtaining the matching block comprises: obtaining a matching block corresponding to a current block based on a match error and a distance between the matching block and the current block by using a full search method.

Specifically, obtain a matching block in the previous frame corresponding to a current based on the match error and the distance between the matching block and the current block by using a full search method; a matching block in the current frame corresponding to the current block of the previous frame based on the match error and the distance between the matching block and the current block by using a full search method.

In this embodiment, during the process of searching the matching block, not only the influence factor of the match error is considered, but also the distance between the matching block and the current block is considered, which is due to the fact that the found block has a certain probability that subjected to noise, boundary and other interference factors in the image, the block corresponding to the current block is not actually corresponding to the current block when directly obtaining the block with the minimum match error (or the match error is within a preset threshold range) using the full search method in the actual search matching process, for example, although the match error between the found block and the current block is minimum, the found block is very far away from the current block, the found block is high in noise probability, by taking the distance into consideration in the process of searching the matching block, the block that is actually most matched with and actually similar to the current block can be found, therefore, when the motion vector of the current block is estimated subsequently, the real moving direction of the current block is estimated favorably, and then the accuracy of motion estimation is improved.

Specifically, in the actual searching and matching process, the match error and the distance can be respectively allocated to the corresponding weight factors, so that the importance degree and the priority of the match error and the distance can be adjusted by adjusting the corresponding weight factors according to the actual situations and requirements, thus the search accuracy of the matching block is improved, and the influence of interference factors such as noise, boundary and the like in the image during the search matching process can be reduced.

In this embodiment, obtaining a matching block in a current frame corresponding to a current block of a previous frame comprises: obtaining a plurality of candidate blocks in the current frame utilizing a full search method, wherein the match error between the candidate blocks and the current block of previous frame is in a preset threshold range; and taking one candidate block with the smallest distance from the current block of the previous frame as the matching block.

In this embodiment, obtaining a matching block in a current frame corresponding to a current block of a previous frame comprises: obtaining a plurality of candidate blocks in the previous frame utilizing a full search method, wherein the match error between the candidate blocks and the current block in the current frame is in a preset threshold range; and taking one candidate block with the smallest distance from the current block of the previous frame as the matching block.

Figure 3:
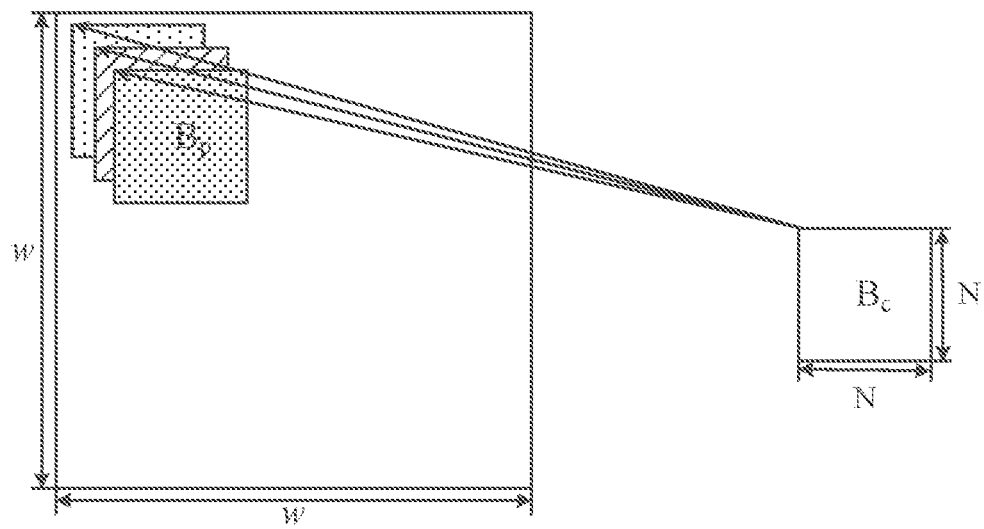
FIG. 3 is a block matching process diagram of full search in the motion estimation method shown in FIG. 2.

In combination with reference to FIG. 3, a full search method is utilized to obtain a matching block corresponding to the current block of the current frame in the previous frame as an example, and a block matching process diagram of the full search method of this embodiment of the disclosure is shown.

In this embodiment, the candidate block in the previous frame of which the match error with the current block $B_C$ of the current frame is within the preset threshold range is obtained based on the formula (I).

$$B = \left[B_p =, \min(\text{error})\middle|\text{error} = \left(\sum_{i=0}^{N-1}\sum_{j=0}^{N-1} B_c(r, c, i, j) - B_p(r+\Delta r, c+\Delta c, i, j)(\Delta r, \Delta c) \in \left|-\frac{w}{2}, \frac{w}{2}\right|\right)\right] \quad (1)$$

where $B_p$ and $B_c$ represent the blocks of the previous frame and the current frame and the size of the blocks is N*N, (r, c) represents the position of the current block in the previous frame, (r+Δr, c+Δc) represents the position of the surrounding blocks of the current block, and the Δr and the Δc respectively represent the offset of the surrounding blocks relative to the vertical and horizontal directions of the current block, w represents the search range of the full search method in the previous frame, and error represents the match error.

In this embodiment, min(error) is represented as the process of finding the minimum value of the match error of all matching blocks.

As an example, the match error can be obtained based on matching criteria such as SAD (Sum of Absolute Differences), MAD (Mean Absolute Differences), MSD (Mean Square Difference Squared, Mean Error Squares), SSD (Sum of Squares Differences, Error Squares), NCCF (Normalized Cross-Correlation Function), etc.

The w represents the search range of the full search method in the previous frame, that is, w defines the size of the search window of the full search method. The larger the search window is, the easier it is to find the globally optimal matching block, but easier it is to increase the probability of finding the block of interference factors such as noise or boundary as well, and the search window is too large to easily increase the operation cost and the calculation amount; the smaller the search window is, the matching block with the minimum match error with the current block is more difficult to find, but since the search window is small, the block within the search range and the current block is relatively close, the probability of finding the interference factors such as noise, boundary and the like is low, and the small search window is beneficial to reduce the calculation amount. Therefore, in the actual searching and matching process, the size of w can be reasonably set according to actual situations and needs.

Specifically, in the actual searching and matching process, there may be a plurality of candidate blocks with the minimum match error with the current block, or the match error between the plurality of candidate blocks and the current block is within a preset threshold range.

The preset threshold range is used for ensuring that the match error between the searched candidate block and the current block is not too large, thereby ensuring that the candidate block has higher similarity and matching degree with the current block. Moreover, in the actual searching and matching process, the match error between the current block and the corresponding block in the previous frame may not be zero, but is close to zero, and the rationality of searching matching is favorably improved by setting a preset threshold range.

In a specific practice, the preset threshold can be given a value in advance, such as a minimum possible SAD value floating up a certain range, the range can be empirically set, and an adaptive value can be given according to the complexity analysis of the current image block.

When there are multiple candidate blocks, taking one candidate block with the minimum distance from the current block as the matching block. In video, the time interval between every two adjacent video frames is relatively short, in the process of motion estimation, it is generally considered that a moving object moves approximately in a straight line within the time interval between two adjacent frames, and since the time interval between two adjacent frames is short, the amount of displacement of a moving object between two adjacent frames is usually small, that is, and the distance between the current block of the current frame and the corresponding block in the previous frame is relatively small, or the distance between the current block of the previous frame and the corresponding block in the current frame is relatively small, by taking one candidate block with the minimum distance from the current block as the matching block, it is not only beneficial to eliminate the block corresponding to noise, boundary and other interference factors in the candidate block, but also beneficial to search the actual matching block corresponding to the current block of the current frame in the previous frame and search the actual matching block corresponding to the current block of the previous block in the current frame, thus the search matching accuracy is improved.

Continuing to refer to FIG. 2, the step S3 is executed: obtaining a first candidate vector set corresponding to a corresponding block of the current frame based on the current block of the current frame and the corresponding matching block; obtaining a second candidate vector set corresponding to a corresponding block of the previous frame based on the current block of the previous frame and the corresponding matching block.

By utilizing the full search method, the matching block corresponding to the current block of the current frame in the previous frame is obtained, so that the most matched block with the current block is searched in the previous frame, particularly, the block which is most matched with the block of the small object is searched for the moving small object, thereby facilitating providing a more accurate original frame motion direction for the moving small object, and further facilitating finding a more accurate motion vector for the moving small object.

The first candidate vector set is used for providing a candidate vector set for obtaining the bidirectional motion vector corresponding to the corresponding block of the frame to be interpolated, so that the motion continuity between the corresponding block of the frame to be interpolated and the previous frame and between the corresponding block of the frame to be interpolated and the current frame is ensured, particularly, the continuity of the motion of the small object is ensured, and the precision of motion estimation is further improved.

By means of the full search method, the matching block corresponding to the current block of the previous frame is obtained in the current frame, so that the most matched block with the current block of the previous frame is searched in the current frame, particularly, the block which is most matched with the corresponding block of the small object is searched for the moving small object, thereby facilitating providing a more accurate original frame motion direction for the moving small object, and further facilitating finding a more accurate motion vector for the moving small object.

The second candidate vector set is used for providing a candidate vector set for obtaining the bidirectional motion vector corresponding to the corresponding block of the frame to be interpolated, so that the motion continuity between the corresponding block of the frame to be interpolated and the previous frame and between the corresponding block of the frame to be interpolated and the current frame is ensured, and in particular, the continuity of the motion of the small object is ensured, so that the precision of motion estimation is improved.

In this embodiment, obtaining the first candidate vector set and the second candidate vector set comprises: obtaining a backward motion vector of the corresponding block of the current frame based on the current block of the current frame and the corresponding matching block; forming the first candidate vector set based on the backward motion vector corresponding to the plurality of blocks of the current frame; obtaining a forward motion vector of the corresponding block of the previous frame based on the current block of the previous frame and the corresponding matching block; forming the second candidate vector set based on the forward motion vector corresponding to the plurality of blocks of the previous frame.

Specifically, after obtaining a matching block in the previous frame corresponding to a current block of the current frame, the position offset of the current block of the current frame relative to the matching block is obtained based on the relative position relationship between the current block of the current frame and the corresponding matching block and is used as the backward motion vector.

Specifically, after a matching block in the current frame corresponding to the current block of the previous frame, the position offset of the current block of the previous frame relative to the matching block is obtained based on the relative position relationship between the current block of the previous frame and the corresponding matching block and is used as the forward motion vector.

Figure 4:
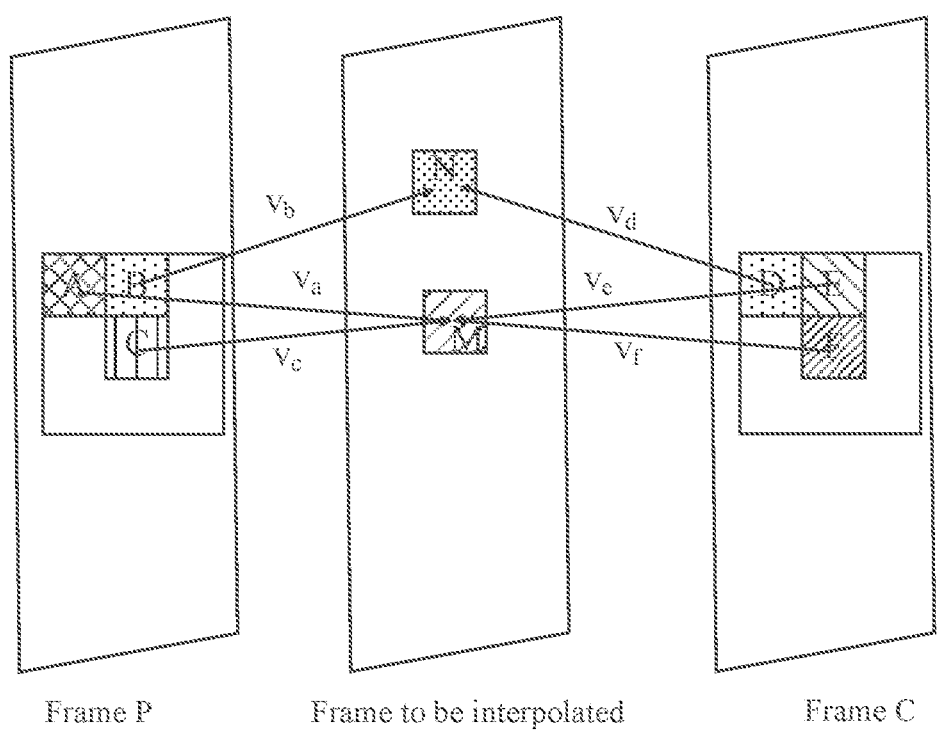
FIG. 4 is a process diagram of obtaining a bidirectional motion vector in the motion estimation method shown in FIG. 2.

In combination with reference to FIGS. 2 and 4, step S4 is performed: setting a frame to be interpolated between the previous frame (as shown in frame P in FIG. 4) and a current frame (as shown in the frame C in FIG. 4). A process for obtaining a bidirectional motion vector in the motion estimation method according to an embodiment of the present disclosure is illustrated in FIG. 4.

By setting the frame to be interpolated between the previous frame and the current frame, the video frame rate is improved, the fluency and smoothness of the video are improved, and further the user experience is improved.

Specifically, the frame to be interpolated is arranged between the previous frame and the current frame in time sequence.

In time sequence, the frame to be interpolated can be located at any position between the previous frame and the current frame.

The frame to be interpolated comprises a plurality of blocks to be interpolated arranged in sequence.

The frame to be interpolated locates between the previous frame and the current frame, a bidirectional motion vector corresponding to the block of the frame to be interpolated will be obtained subsequently based on the first candidate vector set corresponding to the current frame and the second candidate vector set corresponding to the previous frame.

Continuing to refer to FIGS. 2 and 4, the step S5 is executed: obtaining a bidirectional motion vector corresponding to the current block of the frame to be interpolated based on the first candidate vector set and the second candidate vector set, and as a candidate motion vector of the corresponding block of the frame to be interpolated.

In the motion estimation method provided by the embodiment of the present disclosure utilizing a full search method, the current block of the current frame is matched with all blocks within the search range of the corresponding position of the previous frame, and the current block of the previous frame is matched with all blocks within the search range of the corresponding position of the current frame, and the search step size of the full search method is small, thereby a more accurate motion direction of the original frame is provided for estimating the motion direction of the frame to be interpolated, which facilitates increasing the accuracy of motion estimation, and in particular, the accuracy of the motion estimation of the small object is improved, furthermore, the bidirectional motion vector corresponding to the current block of the frame to be interpolated is obtained based on the first candidate vector set and the second candidate vector set obtained by using the full search method, thus, it is beneficial to ensure the motion continuity between the corresponding block of the frame to be interpolated and the previous frame and the current frame, especially to ensure the continuity of the motion of the small object, further improving the accuracy of motion estimation and reducing the probability of occurrence of problems such as "overlap" and "hole".

Figure 5:
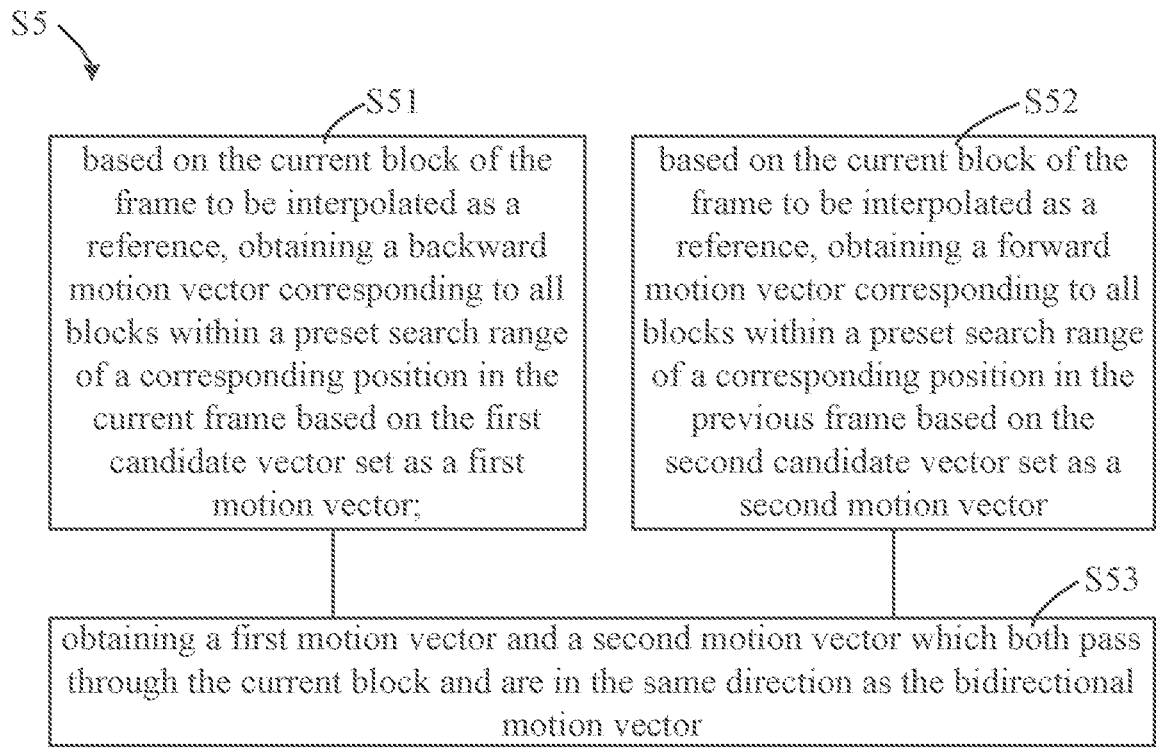
FIG. 5 is a flowchart of an embodiment of step S5 of FIG. 2.

A flowchart of an embodiment of step S5 in FIG. 2 is illustrated in conjunction with reference to FIG. 5. In this embodiment, obtaining a bidirectional motion vector corresponding to a current block of a frame to be interpolated based on the first candidate vector set and the second candidate vector set comprises:

Executing step S51, based on the current block of the frame to be interpolated as a reference, obtaining a backward motion vector corresponding to all blocks within a preset search range of a corresponding position in a current frame based on the first candidate vector set as a first motion vector.

As an example, as shown in FIG. 4, based on the first candidate vector set, a backward motion vector corresponding to a block D, a block E and a block F in a search range of a corresponding position in the current frame (as shown in the frame C in FIG. 4) is obtained based on the first candidate vector set as a reference, and the backward motion vector corresponding to the block E and the block F is used as a first motion vector, corresponding to $V_D$, $V_E$, and $V_F$, respectively.

Executing step S52, based on the current block of the frame to be interpolated as a reference, obtaining a forward motion vector corresponding to all blocks within a preset search range of a corresponding position in the previous frame based on the second candidate vector set as a second motion vector.

As an example, as shown in FIG. 4, based on the current block M in the frame to be interpolated, based on the second candidate vector set, a backward motion vector corresponding to a block A, a block B and a block C in a search range of a corresponding position in a previous frame (as shown in the frame P in FIG. 4) is obtained as a second motion vector, corresponding to $V_A$, $V_B$, and $V_C$, respectively.

Executing step S53, obtaining a first motion vector and a second motion vector which both pass through the current block and are in the same direction as the bidirectional motion vector.

The first motion vector and the second motion vector corresponding to the bidirectional motion vector are in the same direction, and they all pass through the current block of the frame to be interpolated, that is, the two blocks of the bidirectional motion vector that maps to the previous frame and the current frame move in the same direction, which indicates that the motion track of the corresponding block in the previous frame and the current frame of the bidirectional motion vector passes through the current block of the frame to be interpolated and is consistent with the motion of the current block of the frame to be interpolated, so that the obtained candidate motion vector can accurately reflect the motion state of the moving object, in particular to reflect the real motion state of the moving small object.

When there are only one pair of the first motion vector and the second motion vector corresponding to the obtained bidirectional motion vector, the bidirectional motion vector is used as a candidate motion vector of the corresponding block of the frame to be interpolated.

It should be noted that in the actual motion estimation process, a moving object does not necessarily do a strict standard linear motion between adjacent frames, and therefore, in the actual motion estimation process, the first motion vector and the second motion vector which pass through a current block and an included angle between the motion directions are approximately equal to 180 degrees are obtained, and the first motion vector and the second motion vector are used as bidirectional motion vectors. When the included angle between the first motion vector and the second motion vector is approximately equal to 180 degrees, it can be considered that the continuity of the moving object along the movement direction of the first motion vector and the second motion vector is relatively high.

In a specific embodiment, a direction reference value can be set, so that the absolute value of the difference between the included angle between the first and second motion vectors of the current block passing through the frame to be interpolated and 180° can be compared with the direction reference value, if the absolute value of the difference is smaller than the direction reference value, the corresponding first motion vector and the second motion vector are used as bidirectional motion vectors. The reference value may be set to a value close to zero.

It is further noted that in response to the bidirectional motion vectors being multiple pairs, obtaining the candidate motion vector of the corresponding block of the frame to be interpolated further comprises: comparing the match error of the corresponding blocks of the bidirectional motion vectors in the previous frame and in the current frame; and the bidirectional motion vector corresponding to the minimum match error is obtained as the candidate motion vector of the corresponding block of the frame to be interpolated.

Comparing the match error of the corresponding blocks of the bidirectional motion vectors in the previous frame and in the current frame, the smaller the match error, the higher the similarity and matching degree of the corresponding blocks of the bidirectional motion vectors in the previous frame and in the current frame, thereby being beneficial to further improving the accuracy of motion estimation by taking the bidirectional motion vector corresponding to the minimum match error as the candidate motion vector corresponding to the frame to be interpolated.

As an example, there are two pairs of the first and second motion vectors shown in FIG. 4 passing through the current block M of the frame to be interpolated, namely $V_e$ and $V_c$, and $V_a$ and $V_f$. As shown in FIG. 4, while the second motion vector $V_b$ corresponding to the block B and the first motion vector $V_d$ corresponding to the block D passing through the frame to be interpolated, the two motion vectors don't pass through the current block M, but pass through the block N of the frame to be interpolated, and the directions of $V_b$ and $V_d$ are inconsistent, so that the two motion vectors are excluded.

Then, the match error of the block A and the block F is calculated and the match error of the block C and the block E are calculated respectively, and the bidirectional motion vector corresponding to the two blocks with the smaller match error as the candidate motion vector of the block M of the frame to be interpolated.

In other embodiments, there may also be no first motion vector and a second motion vector that pass through the current block of the frame to be interpolated and in the same direction. In this embodiment, a motion vector corresponding to a surrounding neighboring block of a block to be interpolated may be utilized as the candidate motion vector for the corresponding block of the frame to be interpolated. Alternatively, the candidate motion vectors of corresponding blocks of the frame to be interpolated can be obtained in other manners.

Figure 6:
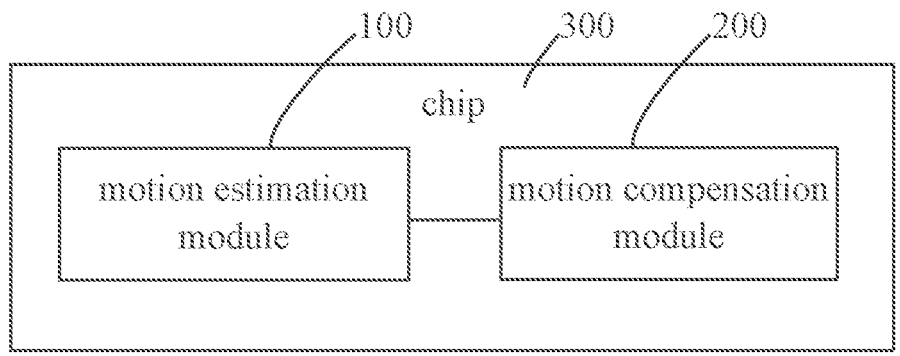
FIG. 6 is a functional block diagram of an embodiment of the chip provided by the present disclosure.

Correspondingly, the disclosure further provides a chip. The chip comprises a motion estimation module. Referring to FIG. 6, a functional block diagram of an embodiment of the chip of the present disclosure is shown, and with reference to FIG. 7, which shows a functional block diagram of an embodiment of the motion module of FIG. 6.

The motion estimation module 100 is used for estimating a corresponding motion vector for the block of a frame to be interpolated.

In this embodiment, the motion estimation module 100 comprises:

a providing unit 10, which is used for providing an original frame, the original frame comprising an adjacent previous frame and a current frame;

a search unit 30, which is used for obtaining a matching block in the previous frame corresponding to a current block of the current frame using a full search method, and obtaining a matching block in the current frame corresponding to the current block of the previous frame utilizing a full search method;

a computing unit 40, which is used for obtaining a first candidate vector set corresponding to a corresponding block of the current frame based on the current block of the current frame and the corresponding matching block, and obtaining a second candidate vector set corresponding to a corresponding block of the previous frame based on to the current block of the previous frame and the corresponding matching block;

a setting unit 50, which is used for setting a frame to be interpolated between the previous frame and the current frame; and an acquisition unit 60, which is used for obtaining a bidirectional motion vector corresponding to the current block of the frame to be interpolated based on the first candidate vector set and the second candidate vector set output by the computing unit 40, and outputting the bidirectional motion vector as a candidate motion vector of the corresponding block of the frame to be interpolated.

The chip 300 provided by the embodiment of the disclosure comprises a motion estimation module 100, the motion estimation module 100 comprises a search unit 30, the search unit 30 utilizes a full search method, and matching the current block of the current frame with all blocks in the search range of the corresponding position of the previous frame, and matching the current block of the previous frame with all the blocks in the search range corresponding to the current frame, and the search step size of the full search method is small, so that a more accurate motion direction of the original frame is provided for estimating the motion direction of the frame to be interpolated, thus the accuracy of motion estimation can be improved, and in particular, the accuracy of the motion estimation of the small object is improved.

The acquisition unit 60 also obtains the bidirectional motion vector corresponding to the current block of the frame to be interpolated based on the first candidate vector set and the second candidate vector set obtained by using the full search method, thereby facilitating ensuring the motion continuity of the corresponding block of the frame to be interpolated and the previous frame and the current frame, in particular to ensuring the continuity of the motion of the small object, further improving the accuracy of the motion estimation, and correspondingly improving the performance of the chip 300, for example, improving the audio and video processing capability of the chip 300 by utilizing a full search method, the search unit 30 blocks match the current block of the current frame with all blocks within the search range of the corresponding position of the previous frame, as well as block match the current block of the previous frame with all blocks within the search range of the corresponding position of the current frame, and the search step size of the full search method is small, thereby a more accurate motion direction of the original frame is provided for estimating the motion direction of the frame to be interpolated, which facilitates increasing the accuracy of motion estimation, and in particular, the accuracy of the motion estimation of the small object is improved.

Furthermore, the acquisition unit 60 obtains the bidirectional motion vector corresponding to the current block of the frame to be interpolated according to the first candidate vector set and the second candidate vector set obtained by using the full search method, thus, it is beneficial to ensure the motion continuity between the corresponding block of the frame to be interpolated and the previous frame and the current frame, especially to ensure the continuity of the motion of the small object, further improving the accuracy of motion estimation and reducing the probability of occurrence of problems such as "overlap" and "hole", the performance of chip 300 is improved correspondingly, for example, the audio and video processing capacity of chip 300 is improved.

The original frame provided by the providing unit 10 is the video frame sequence corresponding to the video image without processed by a video frame rate conversion technique, and the providing unit 10 outputs the previous frame and the current frame in the original frame to the search unit 30.

The previous frame and the current frame may be any two adjacent frames in the original frame.

In the embodiment, the motion module 100 further comprises an identification unit 20 for identifying the block corresponding to the moving small object in the previous frame and the current frame. In particular, the image segmentation technology is utilized by the identification unit 20 to identify the block corresponding to the moving small object in the previous frame and the current frame.

In the present embodiment, the small object refers to a block having an area size of approximately equal to one block.

In a video image, the surrounding blocks of the foreground moving small object are background areas, the block of the background area is typically a stationary block, in other words, the motion vector of the block in the background region is about zero, and the area of the foreground moving small object is small and there is large moving difference between the foreground moving small object and the background area, if the adjacent blocks around the small object are directly used to perform motion estimation on the small object, the problem of inaccurate estimation is easy to exist, therefore, by identifying the block corresponding to the moving small object in the current frame and the previous frame through the identification unit 20, the corresponding matching block is obtained only for the moving small object by using a full search method, which is beneficial to improve the accuracy of the motion estimation, and reduce the operation complexity and the amount of operation, thus the response speed is improved and the cost is saved.

Search unit 30 is used for obtaining a matching block corresponding to a current block of a current frame in a previous frame by using a full search method, as well as obtaining a matching block corresponding to the current block of the previous frame in the current frame.

The search unit 30 obtains a matching block in the previous frame corresponding to a current block of the current frame, so that the computing unit 40 obtains the unidirectional motion vector which points from the block of the current frame to the corresponding matching block as a backward motion vector of the corresponding block of the current frame.

The search unit 30 obtains a matching block in the current frame corresponding to the current block of the previous frame, so that the computing unit 40 obtains the unidirectional motion vector pointing from the block of the previous to the matching block of the current frame can be obtained subsequently according to the current block of the previous frame and the corresponding matching block as a forward motion vector of the corresponding block of the previous frame.

Full search algorithm is the simplest and most reliable search matching method, by using the full search method, the current block of the current frame is matched with all blocks in the search range of the corresponding position of the previous frame, and the current block of the previous frame is matched with all blocks in the search range of the corresponding position of the current frame, that is, the full search algorithm calculates the match errors of the two blocks in all possible positions in the search window, the obtained motion vector corresponding to the minimum matching error is the global optimal motion vector, furthermore, the search step size of the full search method is small, thereby a more accurate motion direction of the original frame is provided for estimating the motion direction of the frame to be interpolated, which facilitates increasing the accuracy of motion estimation, and in particular, the accuracy of the motion estimation of the small object is improved.

In this embodiment, the motion module 100 further comprises an identification unit 20, which is used for identifying whether the current block is a moving small object or not, therefore, the search unit 30 is configured to obtain the corresponding matching block in the previous frame for the block of the moving small object in the current frame utilizing a full search method, as well as obtain the matching block corresponding to the block of the previous frame small object in the current frame utilizing a full search method, the matching block corresponding to the corresponding block of the moving small object is obtained, the block which is most matched with the corresponding block of the small object is searched in the previous frame for the current frame, and the block which is most matched with the corresponding block of the small object is searched for the previous frame, so that a more accurate original frame motion direction is provided for the moving small object, and the more accurate motion vector is obtained for the small moving object, meanwhile, the operation amount is reduced, and the response speed of the chip 300 is improved.

Specifically, in this embodiment, the full search method searches all pixel points in the search range, as an example, the search step size of the full search method is one pixel, the process of searching and matching is to conduct a blanket search in the step size of one pixel, the similarity is compared point by point, which is of great significance for searching and matching of small objects in the video, and the accuracy of obtaining the corresponding matching block of the motion small object is facilitated. Correspondingly, when the computing unit 40 obtains the backward motion vector according to the current block of the current frame and the corresponding matching block, and obtaining the forward motion vector according to the current block of the previous frame and the corresponding matching block, the accuracy of motion direction estimation for small moving objects is improved.

It should be noted that in other embodiments, in order to reduce the calculation amount and increase the response speed, and according to the actual operation accuracy requirements, the search step size of the full search method can also be larger than one pixel, for example, the search step size of the full search method is an integer multiple of one pixel and smaller than the side length of the block. In other words, the search step size of the full search method is greater than or equal to one pixel, and the search step size of the full search method is smaller than the side length of the block, that is, the search step size of the full search method is smaller than the side length of the moving small object, compared with the method that utilizes the adjacent block around the block of the small object to perform motion estimation on the small object, the search step size of the full search method provided by the embodiment of the disclosure is smaller, and the search process is finer, thus a more accurate motion direction is estimated for the motion small object.

As an example, the similarity and matching degree may be obtained by the full search method based on matching criteria such as SAD (Sum of Absolute Differences), MAD (Mean Absolute Differences), MSD (Mean Square Difference Squared, Mean Error Squares), SSD (Sum of Squares Differences, Error Squares), NCCF (Normalized Cross-Correlation Function), etc.

In the embodiment, the search unit 30 obtains the matching block corresponding to the current block based on a match error and a distance between the match error and the current block by using a full search method.

In the embodiment, the search unit 30 not only considers the influence factor of the match error, but also considers the distance between the search unit and the current block, which is due to the fact that the found block has a certain probability that subjected to noise, boundary and other interference factors in the image, the block corresponding to the current block is not actually corresponding to the current block when directly obtaining the block with the minimum match error (or the match error is within a preset threshold range) using the full search method in the actual search matching process, for example, although the match error between the found block and the current block is minimum, the found block is very far away from the current block, the found block is high in noise probability, by taking the distance into consideration in the process of searching the matching block, the block that is actually most matched with and actually similar to the current block can be found, therefore, when the motion vector of the current block is estimated subsequently, the real moving direction of the current block is estimated favorably, and then the accuracy of motion estimation is improved.

Specifically, in the actual searching and matching process, the match error and the distance can be respectively allocated to the corresponding weight factors, so that the importance degree and the priority of the match error and the distance can be adjusted by adjusting the corresponding weight factors according to the actual situations and requirements, thus the search accuracy of the matching block is improved, and the influence of interference factors such as noise, boundary and the like in the image during the search matching process can be reduced.

Specifically, the search unit 30 obtains a matching block in a current frame corresponding to a current block of a previous frame based on the match error and the distance between the match error and the current block by using a full search method, as well as obtain a matching block in a current frame corresponding to a current block of a previous frame.

In this embodiment, the search unit 30 obtains a plurality of candidate blocks in the previous frame utilizing a full search method, wherein the match error between the candidate blocks and the current block in the current frame is in a preset threshold range; the search unit 30 takes one candidate block with the smallest distance from the current block of the previous frame as the matching block.

In this embodiment, the search unit 30 obtains a plurality of candidate blocks in the current frame utilizing a full search method, wherein the match error between the candidate blocks and the current block of previous frame is in a preset threshold range; the search unit 30 takes one candidate block with the smallest distance from the current block of the previous frame as the matching block.

Specifically, in the actual searching and matching process, there may be a plurality of candidate blocks with the minimum match error with the current block, or the match error between the plurality of candidate blocks and the current block is within a preset threshold range.

The preset threshold range is used for ensuring that the match error between the searched candidate block and the current block is not too large, thereby ensuring that the candidate block has higher similarity and matching degree with the current block. Moreover, in an actual search matching process, the match error between the current block and the corresponding block in the previous frame may not be zero, but is close to zero, and the rationality of searching matching is favorably improved by setting a preset threshold range.

In a specific practice, the preset threshold can be given a value in advance, such as a minimum possible SAD value floating up a certain range, the range can be empirically set, and an adaptive value can be given according to the complexity analysis of the current image block.

When there are multiple candidate blocks, taking one candidate block with the minimum distance from the current block as the matching block. In video, the time interval between every two adjacent video frames is relatively short, in the process of motion estimation, it is generally considered that a moving object moves approximately in a straight line within the time interval between two adjacent frames, and since the time interval between two adjacent frames is short, the amount of displacement of a moving object between two adjacent frames is usually small, by taking one candidate block with the minimum distance from the current block as the matching block, it is not only beneficial to eliminate the block corresponding to noise, boundary and other interference factors in the candidate block, but also beneficial to search the actual matching block corresponding to the current block of the current frame in the previous frame and search the actual matching block corresponding to the current block of the previous block in the current frame, thus the search matching accuracy is improved.

The search unit 30 utilizes a full search method, which is beneficial to find the block which is most matched with the current block of the current frame in the previous frame as well as find the block which is most matched with the current block of the previous frame in the current frame, especially to find the block most matched with the corresponding block for the moving small object, thereby facilitating the computing unit 40 to estimate a more accurate unidirectional motion vector between every two adjacent frames in the original frame, especially finding a more accurate motion vector for the moving small object, and providing a more accurate original frame movement direction for the moving small object.

Figure 7:
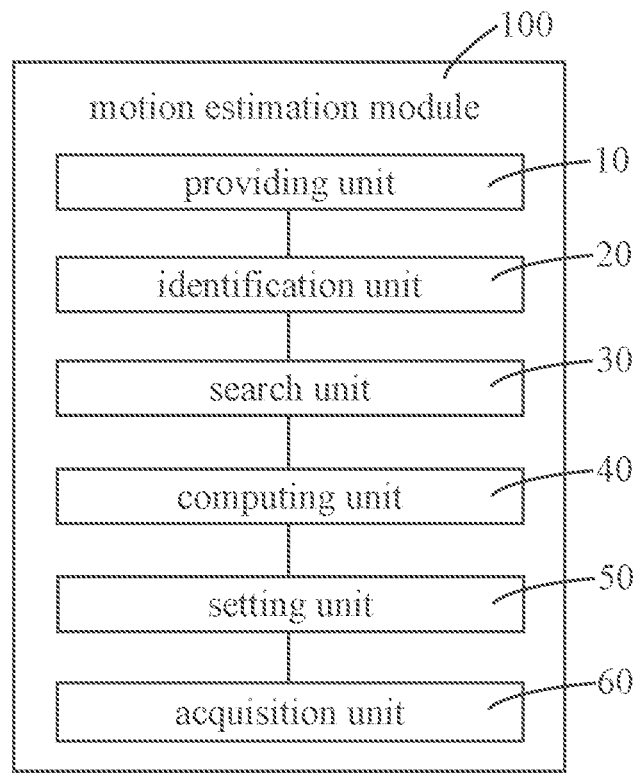
FIG. 7 is a functional block diagram of an embodiment of the motion estimation module of FIG. 6.
Figure 8:
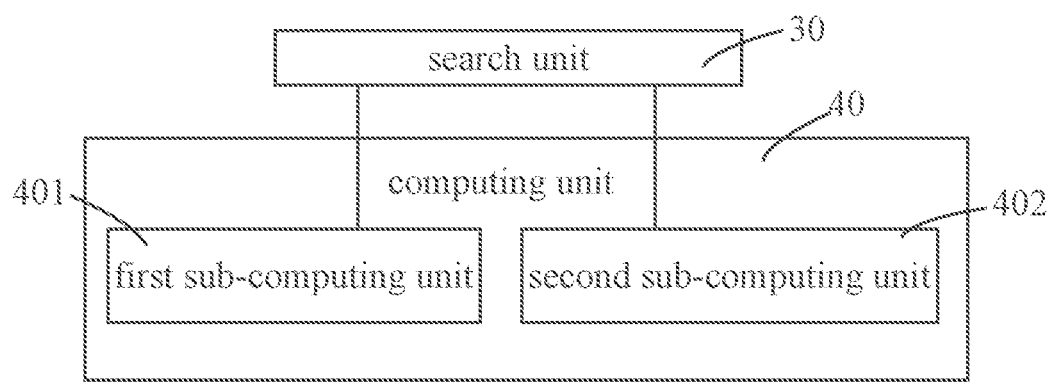
FIG. 8 is a functional block diagram of an embodiment of the computing unit of FIG. 7.

Referring to FIG. 8, which is a functional block diagram of an embodiment of the computing unit in FIG. 7, in this embodiment, the computing unit 40 comprises: a first sub-computing unit 401, which is used for obtaining a backward motion vector of the corresponding block of the current frame based on the current block of the current frame and the corresponding matching block, and outputting the backward motion vector corresponding to the plurality of blocks of the current frame as the first candidate vector set; a second sub-computing unit 402, which is used for obtaining a forward motion vector of the corresponding block of the previous frame based on the current block of the previous frame and the corresponding matching block, and outputting the forward motion vector corresponding to the plurality of blocks of the previous frame as the second candidate vector set.

The first candidate vector set is used for providing a candidate vector set for obtaining the bidirectional motion vector corresponding to the corresponding block of the frame to be interpolated, so that the motion continuity between the corresponding block of the frame to be interpolated and the previous frame and between the corresponding block of the frame to be interpolated and the current frame is ensured, particularly, the continuity of the motion of the small object is ensured, and the precision of motion estimation is further improved.

Specifically, the computing unit 40 obtains the position offset of the current block of the current frame relative to the matching block based on the relative position relationship between the current block of the current frame and the corresponding matching block and is used as the backward motion vector.

The second candidate vector set is used for providing a candidate vector set for obtaining the bidirectional motion vector corresponding to the corresponding block of the frame to be interpolated, so that the motion continuity between the corresponding block of the frame to be interpolated and the previous frame and between the corresponding block of the frame to be interpolated and the current frame is ensured, and in particular, the continuity of the motion of the small object is ensured, so that the precision of motion estimation is improved.

Specifically, the computing unit 40 obtains the position offset of the current block of the previous frame relative to the matching block based on the relative position relationship between the current block of the previous frame and the corresponding matching block and is used as the forward motion vector.

The setting unit 50 is used for setting a frame to be interpolated located between the previous frame and the current frame, thereby improving the video frame rate, and being beneficial to improving the fluency and smoothness of the video. Specifically, the frame to be interpolated is arranged between the previous frame and the current frame by the setting unit 50 in time sequence. In time sequence, the frame to be interpolated can be located at any position between the previous frame and the current frame.

The frame to be interpolated comprises a plurality of blocks to be interpolated arranged in sequence.

The setting unit 50 sets the frame to be interpolated between the previous frame and the current frame, so that the acquisition unit 60 obtains the bidirectional motion vector corresponding to the block of the frame to be interpolated based on the first candidate vector set corresponding to the current frame and the second candidate vector set corresponding to the previous frame.

The acquisition unit 60 is used for obtaining bidirectional motion vector corresponding to the current block of the frame to be interpolated according to the first candidate vector set and the second candidate vector set obtained by the search unit 30 using the full search method, thus, it is beneficial to ensure the motion continuity between the corresponding block of the frame to be interpolated and the previous frame and the current frame, especially to ensure the continuity of the motion of the small object, further improving the accuracy of motion estimation and reducing the probability of occurrence of problems such as "overlap" and "hole".

Figure 9:
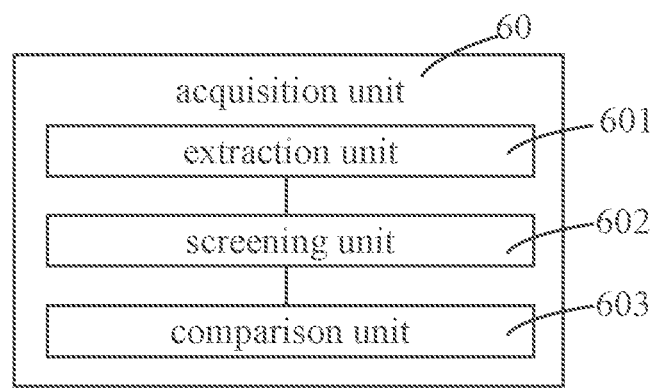
FIG. 9 is a functional block diagram of an embodiment of the acquisition unit of FIG. 7.

Reference is made to FIG. 9, is a functional block diagram of an embodiment of the acquisition unit in FIG. 7, in this embodiment, the acquisition unit 60 comprises an extraction unit 601, which is used for obtaining a backward motion vector corresponding to all blocks within a preset search range of a corresponding position in the current frame based on the first candidate vector set as a first motion vector, based on the current block of the frame to be interpolated as a reference, and based on the current block of the frame to be interpolated as a reference, obtaining a forward motion vector corresponding to all blocks in a preset search range of a corresponding position in the previous frame based on the second candidate vector set as a second motion vector, a screening unit 602, which is used for obtaining a first motion vector and a second motion vector which both pass through the current block and are in the same direction as the bidirectional motion vector.

The first motion vector and the second motion vector corresponding to the bidirectional motion vector are in the same direction, and they all pass through the current block of the frame to be interpolated, that is, the two blocks of the bidirectional motion vector that maps to the previous frame and the current frame move in the same direction, which indicates that the motion track of the corresponding block in the previous frame and the current frame of the bidirectional motion vector passes through the current block of the frame to be interpolated and is consistent with the motion of the current block of the frame to be interpolated, so that the obtained candidate motion vector can accurately reflect the motion state of the moving object, in particular to reflect the real motion state of the moving small object.

When there are only one pair of the first motion vector and the second motion vector corresponding to the obtained bidirectional motion vector, the bidirectional motion vector is used as a candidate motion vector of the corresponding block of the frame to be interpolated.

It should be noted that in the actual motion estimation process, a moving object does not necessarily do a strict standard linear motion between adjacent frames, and therefore, in the actual motion estimation process, the first motion vector and the second motion vector which pass through a current block and an included angle between the motion directions are approximately equal to 180 degrees are obtained, and the first motion vector and the second motion vector are used as bidirectional motion vectors. When the included angle between the first motion vector and the second motion vector is approximately equal to 180 degrees, it can be considered that the continuity of the moving object along the movement direction of the first motion vector and the second motion vector is relatively high.

In a specific embodiment, a direction reference value can be set, so that the absolute value of the difference between the included angle between the first and second motion vectors of the current block passing through the frame to be interpolated and 180° can be compared with the direction reference value, if the absolute value of the difference is smaller than the direction reference value, the corresponding first motion vector and the second motion vector are used as bidirectional motion vectors. The reference value may be set to a value close to zero.

In this embodiment, the acquisition unit 60 further comprises a comparison unit 603, which is used for comparing the match error of corresponding blocks of the bidirectional motion vector in the previous frame and the current frame in response to the bidirectional motion vector output by the screening unit being multiple pairs, and outputting the bidirectional motion vector corresponding to the minimum match error as the candidate motion vector of the corresponding block of the frame to be interpolated.

The comparison unit 603 is used for comparing the match error of the corresponding blocks of the bidirectional motion vectors in the previous frame and in the current frame, the smaller the match error, the higher the similarity and matching degree of the corresponding blocks of the bidirectional motion vectors in the previous frame and in the current frame, thereby being beneficial to further improving the accuracy of motion estimation by taking the bidirectional motion vector corresponding to the minimum match error as the candidate motion vector corresponding to the frame to be interpolated.

In other embodiments, there may also be no first motion vector and a second motion vector that pass through the current block of the frame to be interpolated and in the same direction. In this embodiment, a motion vector corresponding to a surrounding neighboring block of the current block to be interpolated may be utilized as the candidate motion vector for the corresponding block of the frame to be interpolated. Alternatively, the candidate motion vectors of corresponding blocks of the frame to be interpolated can be obtained in other manners.

In this embodiment, the chip 300 further comprises a motion compensation module 200, used for performing motion compensation on blocks of the frame to be interpolated based on the candidate motion vectors output by the motion estimation module 100.

In the embodiment, the chip 300 can be a multimedia chip, an audio and video chip, a video processing chip, a MEMC (Motion Estimation and Motion Compensation) chip and the like.

The chip 300 provide by the embodiment of the disclosure comprises the motion estimation module 200, which is beneficial to improving the audio and video processing capability of the chip, thereby facilitating optimizing the visual experience of the user and improving the user experience.

Chip 300 in an embodiment of the present disclosure can be implemented by a digital logic circuit, each of which is used by a logic operation to perform the method mentioned in the previous corresponding embodiment. Alternatively, the chip 300 May be implemented by a general-purpose processor that runs the relevant motion estimation methods by executing a computer software program.

Correspondingly, the embodiments of the disclosure also provides an electronic device, which comprises the chip 300 provided by the embodiment of the disclosure.

In this embodiment, the electronic device is a device capable of performing video image processing, such as a set-top box or a display device. The display device can be a television, a projector, a mobile phone and the like.

According to the embodiments provided above, the chip provided by the embodiment of the disclosure has high audio-video processing capability, so that the video fluency and smoothness of the electronic device can be improved, which is conducive to improving the user's perception and providing the user with a higher visual experience.

Correspondingly, the embodiments of the disclosure also provides a storage medium, wherein the storage medium stores one or more computer instructions, and the one or more computer instructions are used for implementing the motion estimation method provided by the embodiment of the disclosure.

The storage medium is a computer-readable storage medium, and the storage medium may be a read-only memory (ROM), a random access memory (RAM), a U-disk, a mobile hard disk, a magnetic disk or an optical disk and the like.

Embodiments of the disclosure described above are combinations of elements and features of the present disclosure. Unless otherwise noted, the elements or features may be regarded as selective. The various elements or features may be practiced without being combined with other elements or features. In addition, embodiments of the present disclosure may be constructed by combining part of elements and/or features. The sequence of operations described in the embodiments of the present disclosure may be rearranged. Some configurations of any of the embodiments may be included in another embodiment and replaced with corresponding configurations of another embodiment. It will be apparent to those skilled in the art that the claims that do not explicitly refer to each other in the appended claims may be combined with embodiments of the disclosure, or may be included as new claims in the modification following the filing of this application.

Embodiments of the disclosure may be implemented by various means such as hardware, firmware, software, or a combination thereof. In a hardware configuration, a method according to an exemplary embodiment of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In firmware or software configurations, embodiments of the present disclosure may be implemented in the form of modules, processes, functions, and the like. The software code may be stored in the memory unit and executed by the processor. The memory unit is internal or external to the processor and can send data to and receive data from the processor via various known means.

Although the present disclosure is disclosed as above, the present disclosure is not limited thereto. Those skilled in the art can make various changes and modifications without departing from the spirit and scope of the present disclosure. Therefore, the scope of the present disclosure should be accorded the scope defined by the claims.

What is claimed is:

1. A motion estimation method, comprising:
providing an original frame, the original frame comprising an adjacent previous frame and a current frame;
obtaining a matching block in the previous frame corresponding to a current block of the current frame using a full search method;
obtaining a matching block in the current frame corresponding to the current block of the previous frame utilizing a full search method;
obtaining a first candidate vector set corresponding to a corresponding block of the current frame based on the current block of the current frame and the corresponding matching block;
obtaining a second candidate vector set corresponding to a corresponding block of the previous frame based on the current block of the previous frame and the corresponding matching block;
setting a frame to be interpolated between the previous frame and the current frame; and
obtaining a bidirectional motion vector corresponding to the current block of the frame to be interpolated based on the first candidate vector set and the second candidate vector set, as a candidate motion vector of the corresponding block of the frame to be interpolated.

2. The motion estimation method of claim 1, wherein obtaining the matching block comprises: obtaining the matching block corresponding to the current block based on a match error and a distance between the match error and the current block by using a full search method.

3. The motion estimation method of claim 2, wherein obtaining a matching block in a current frame corresponding to a current block of a previous frame comprises: obtaining a plurality of candidate blocks in the current frame utilizing a full search method, wherein the match error between the candidate blocks and the current block of previous frame is in a preset threshold range; and taking one candidate block with the smallest distance from the current block of the previous frame as the matching block, obtaining a matching block in a current frame corresponding to a current block of a previous frame comprises: obtaining a plurality of candidate blocks in the previous frame utilizing a full search method, wherein the match error between the candidate blocks and the current block in the current frame is in a preset threshold range; and taking one candidate block with the smallest distance from the current block of the previous frame as the matching block.

4. The motion estimation method of claim 1, wherein the search step size of the full search method is greater than or equal to one pixel, and the search step size of the full search method is smaller than the side length of the block.

5. The motion estimation method of claim 1, wherein obtaining the first candidate vector set and the second candidate vector set comprises:

obtaining a backward motion vector of the corresponding block of the current frame based on the current block of the current frame and the corresponding matching block;

forming the first candidate vector set based on the backward motion vector corresponding to the plurality of blocks of the current frame;

obtaining a forward motion vector of the corresponding block of the previous frame based on the current block of the previous frame and the corresponding matching block; and forming the second candidate vector set based on the forward motion vector corresponding to the plurality of blocks of the previous frame.

6. The motion estimation method of claim 1, wherein obtaining a bidirectional motion vector corresponding to a current block of a frame to be interpolated based on the first candidate vector set and the second candidate vector set comprises:

based on the current block of the frame to be interpolated as a reference, obtaining a backward motion vector corresponding to all blocks within a preset search range of a corresponding position in the current frame based on the first candidate vector set as a first motion vector;

based on the current block of the frame to be interpolated as a reference, obtaining a forward motion vector corresponding to all blocks within a preset search range of a corresponding position in the previous frame based on the second candidate vector set as a second motion vector; and obtaining a first motion vector and a second motion vector which both pass through the current block and are in the same direction as the bidirectional motion vector.

7. The motion estimation method of claim 6, wherein in response to the bidirectional motion vector being multiple pairs, obtaining the candidate motion vector of the corresponding block of the frame to be interpolated further comprises:

comparing the match error of corresponding blocks of the bidirectional motion vector in the previous frame and the current frame; and obtaining the bidirectional motion vector corresponding to the minimum match error as the candidate motion vector of the corresponding block of the frame to be interpolated.

8. The motion estimation method of claim 1, wherein the motion estimation method further comprises:

before a full search method is utilized to obtain a matching block in the previous frame corresponding to the current block of the current frame, and before obtaining a matching block in the current frame corresponding to the current block of the previous frame using a full search method, identifying a block corresponding to a foreground moving small object in the previous frame and the current frame; and obtaining the corresponding matching block in the previous frame for the block of the moving small object in the current frame utilizing a full search method; and obtaining a matching block corresponding to the block of the previous frame small object in the current frame utilizing a full search method.

9. The motion estimation method of claim 8, further comprising utilizing image segmentation method to identify the block corresponding to the foreground moving small object in the previous frame and the current frame.

10. A chip, wherein the chip comprises a motion estimation module, the motion estimation module comprises:

a providing unit, which is used for providing an original frame, he original frame comprising an adjacent previous frame and a current frame;

a search unit, which is used for obtaining a matching block in the previous frame corresponding to a current block of the current frame using a full search method, and obtaining a matching block in the current frame corresponding to the current block of the previous frame utilizing a full search method;

a computing unit, which is used for obtaining a first candidate vector set corresponding to a corresponding block of the current frame based on the current block of the current frame and the corresponding matching block, and obtaining a second candidate vector set corresponding to a corresponding block of the previous frame based on the current block of the previous frame and the corresponding matching block;

a setting unit, which is used for setting a frame to be interpolated between the previous frame and the current frame; and an acquisition unit, which is used for obtaining a bidirectional motion vector corresponding to the current block of the frame to be interpolated based on the first candidate vector set and the second candidate vector set output by the computing unit, and outputting the bidirectional motion vector as a candidate motion vector of the corresponding block of the frame to be interpolated.

11. The chip of claim 10, wherein the computing unit comprises: a first sub-computing unit, which is used for obtaining a backward motion vector of the corresponding block of the current frame based on the current block of the current frame and the corresponding matching block, and outputting the backward motion vector corresponding to the plurality of blocks of the current frame as the first candidate vector set;

a second sub-computing unit, which is used for obtaining a forward motion vector of the corresponding block of the previous frame based on the current block of the previous frame and the corresponding matching block, and outputting the forward motion vector corresponding to the plurality of blocks of the previous frame as the second candidate vector set.

12. The chip of claim 10, wherein the acquisition unit comprises:

an extraction unit, which is used for obtaining a backward motion vector corresponding to all blocks within a preset search range of a corresponding position in the current frame based on the first candidate vector set as a first motion vector, based on the current block of the frame to be interpolated as a reference, and based on the current block of the frame to be interpolated as a reference, obtaining a forward motion vector corresponding to all blocks in a preset search range of a corresponding position in the previous frame based on the second candidate vector set as a second motion vector;

a screening unit, which is used for obtaining a first motion vector and a second motion vector which both pass through the current block and are in the same direction as the bidirectional motion vector.

13. The chip of claim 12, wherein the acquisition unit further comprises a comparison unit, which is used for comparing the match error of corresponding blocks of the bidirectional motion vector in the previous frame and the current frame in response to the bidirectional motion vector output by the screening unit being multiple pairs, and outputting the bidirectional motion vector corresponding to the minimum match error as the candidate motion vector of the corresponding block of the frame to be interpolated.

14. The chip of claim 10, wherein the motion estimation module further comprises an identification unit, which is used for identifying a block corresponding to a foreground moving small object in the previous frame and the current frame;

the search unit is used for obtaining the corresponding matching block in the previous frame for the block of the moving small object in the current frame utilizing a full search method, and obtaining a matching block corresponding to the block of the previous frame small object in the current frame utilizing a full search method.

15. The chip of claim 10, wherein the chip further comprises: a motion compensation module, used for performing motion compensation on blocks of the frame to be interpolated based on the candidate motion vectors output by the motion estimation module.

16. An electronic device, comprising the chip of claim 10.

17. The electronic device of claim 16, wherein the electronic device is set top box or display device.

* * * * *